United States Patent Office 2,802,869
Patented Aug. 13, 1957

2,802,869

METHOD OF MAKING CINNAMIC ACID AND SALTS THEREOF

Robert S. Montgomery, Midland, Mich., assignor to The Dow Chemical Company, Midland, Mich., a corporation of Delaware No Drawing. Application December 8, 1952,
Serial No. 324,830

8 Claims. (Cl. 260—515)

This invention concerns a new and simple method for making cinnamic acid or a salt thereof.

It has been found that an alkali metal salt of cinnamic acid can be formed directly, and in good yield, by heating beta-hydroxy-beta-phenyl-propionitrile together with an aqueous solution of a strong alkali. During the heating operation, the beta-hydroxy-beta-phenyl-propionitrile is both dehydrated to form an olefinic linkage in the side chain and hydrolyzed to form the carboxylate radical. The reactions which occur are summarized in the following equation:

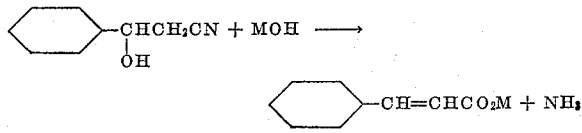

wherein M represents an alkali metal, e. g. sodium or potassium.

In practice of the invention, beta-hydroxy-beta-phenyl-propionitrile is heated at a reaction temperature of 80° C. or above with an aqueous solution containing its molecular equivalent or more, usually between 1.25 and 2 molecular equivalents, of an alkali metal hydroxide such as NaOH, KOH, or both. The akali need not be pure, i. e. a technical grade of NaOH or KOH containing minor amounts of usual impurities such as the metal carbonate or metal chloride can satisfactorily be used. Because of its availability and low cost, sodium hydroxide is usually employed. The alkali is usually employed as an aqueous solution of the same in a concentration of from 5 to 15, preferably from 7 to 12 percent by weight, but it can, though less conveniently, be of lower or higher concentrations, e. g. of concentrations up to 20 percent by weight or higher. An aqueous sodium hydroxide solution of less than 5 percent concentration is slow in reacting. When using aqueous sodium hydroxide solutions of greater than 10% percent concentration, the sodium cinnamate product frequently crystallizes as it is formed, or upon subsequent cooling of the mixture to room temperature or thereabout.

The reaction is usually carried out by heating the mixture to boiling under reflux at atmospheric pressure for several hours, usually from 8 to 15 hours, but it can be carried out at lower or higher temperatures, e. g. from 80° to 175° C. or above, provided the pressure is sufficient to maintain the mixture in liquid condition. After completing the reaction, the mixture usually contains tarry impurities. The latter can be removed in any of several ways. For instance, they can at least partially be removed by extraction with a water-immiscible organic solvent such as benzene, chlorobenzene, toluene, or xylene, etc. In instances in which the mixture is strongly alkaline, tarry impurities may be removed by treating the mixture with sufficient acid, e. g. hydrochloric or sulfuric acid, to precipitate such impurities and render the mixture only slightly alkaline, and filtering the mixture. Prior to the filtration, the mixture is advantageously cooled to about room temperature or lower. It preferably contains sufficient water to retain the alkali metal cinnamate product in solution. The use, as a starting material, of an aqueous sodium hydroxide solution of from 5 to 10 weight percent concentration usually provides sufficient water to retain the product in solution. However, the reacted mixture is frequently diluted with water prior to being filtered so as to avoid possible loss of product. Frequently, both of the purification steps just mentioned are employed.

After the above treatments for removal of impurities, the reaction liquor may be acidified, e. g. with hydrochloric or sulfuric acid, to precipitate the cinnamic acid and the latter be separated from the liquor by filtration and dried. Alternatively, the alkaline reaction liquor may be concentrated by evaporation and cooled to crystallize the alkali metal cinnamate therefrom.

The following example describes a way in which the invention has been practiced, but is not to be construed as limiting its scope.

*Example*

A mixture of 100 grams of beta-hydroxy-beta-phenyl-propionitrile and 400 cc. of an aqueous sodium hydroxide solution of 10 weight percent concentration was boiled under reflux at atmospheric pressure for 8 hours. The mixture was then cooled to room temperature and extracted with about one-fifth of its volume of toluene to remove tarry impurities therefrom. The aqueous reaction liquor remained of a dark color. It was treated with sufficient of a concentrated aqueous hydrochloric acid solution to render it only slightly alkaline, whereby a small amount of tarry material was precipitated. This was removed by filtration. The filtrate was acidified by treatment with a concentrated hydrochloric acid solution, whereby cinnamic acid was precipitated. The cinnamic acid was removed by filtration, washed with a small amount of water, and dried. There was obtained 73 grams of white crystalline cinnamic acid. The yield was approximately 73 percent of theoretical, based on the amount of beta-hydroxy-beta-phenyl-propionitrile used as a starting material.

I claim:

1. A method which comprises heating a liquid mixture of beta-hydroxy-beta-phenyl-propionitrile together with a molecular excess of an alkali metal hydroxide in the form of from 5 to 20 percent by weight aqueous solution thereof at reaction temperatures between about 80° and about 175° C., whereby an alkali metal cinnamate is formed.

2. A method which comprises heating one molecular equivalent of beta-hydroxy-beta-phenyl-propionitrile together with from 1.25 to 2 molecular equivalents of an alkali metal hydroxide in the form of a from 5 to 15 percent by weight aqueous solution thereof to approximately the boiling temperature of the mixture at approximately atmospheric pressure for at least 8 hours, whereby an alkali metal cinnamate is formed.

3. A method, as claimed in claim 2, wherein the alkali metal hydroxide is sodium hydroxide.

4. A method, as claimed in claim 2, wherein the alkali metal hydroxide is sodium hydroxide, and the reaction is accomplished by heating the reaction mixture to approximately the boiling temperature at atmospheric pressure for from 8 to 10 hours.

5. A method, as claimed in claim 2, wherein the liquor resulting from the reaction is acidified to precipitate cinnamic acid and the latter is removed from the mixture.

6. A method which comprises heating one molecular equivalent of beta-hydroxy-beta-phenyl-propionitrile together with from 1.25 to 2 molecular equivalents of sodium hydroxide in the form of a from 5 to 15 percent by weight aqueous solution thereof to approximately the boiling temperature at atmospheric pressure for from 8 to 10 hours, removing tarry by-products from the reaction liquor, acidifying the latter to precipitate cinnamic acid therefrom, and separating the cinnamic acid from the mixture.

7. A method which comprises heating one molecular equivalent of beta-hydroxy-beta-phenyl-propionitrile together with from 1.25 to 2 molecular equivalents of sodium hydroxide, in the form of a from 5 to 15 percent by weight aqueous solution thereof, to approximately the boiling temperature of the mixture at about atmospheric pressure for from 8 to 10 hours, precipitating tarry material from the reaction liquor by treating the latter with an acid in amount rendering the liquor only slightly alkaline and removing the precipitate, thereafter acidifying the liquor to precipitate cinnamic acid therefrom, and separating cinnamic acid from the mixture.

8. In a method wherein beta-hydroxy-beta-phenyl-propionitrile is reacted with an aqueous alkali metal hydroxide solution to form an alkaline aqueous solution of an alkali metal cinnamate together with insoluble tarry by-products, the steps of removing the insoluble tarry material, precipitating a further amount of tarry material from the liquor by treating the latter with an acid in amount rendering the liquor only slightly alkaline and removing the tarry precipitate, thereafter acidifying the liquor to precipitate cinnamic acid therefrom, and separating the precipitated cinnamic acid from the mixture.

References Cited in the file of this patent

UNITED STATES PATENTS

| | | |
|---|---|---|
| 2,461,492 | Carpenter et al. | Feb. 8, 1949 |
| 2,500,403 | Davis et al. | Mar. 14, 1950 |
| 2,516,126 | Lauer et al. | July 25, 1950 |

FOREIGN PATENTS

| | | |
|---|---|---|
| 169,186 | Germany | Apr. 11, 1906 |
| 745,447 | Germany | May 12, 1943 |

OTHER REFERENCES

Fittig et al.: Andrijewski, Beilstein (Handbuch, 4th ed.), vol. 9, p. 574 (1926).

Degering: "An Outline of Organic Nitrogen Compounds," University Lithoprinters (Michigan), 1945 (pp. 504 and 508).

Wagner et al.: "Synthetic Organic Chemistry," Wiley & Sons (New York), 1953 (p. 35).